United States Patent

Mandel et al.

[11] Patent Number: 5,970,426
[45] Date of Patent: Oct. 19, 1999

[54] EMISSION MONITORING SYSTEM

[75] Inventors: Stephen Mandel, Parsippany, N.J.; Richard A. Sobel, North Canton, Ohio

[73] Assignee: Rosemount Analytical Inc., La Habra, Calif.

[21] Appl. No.: 08/867,301

[22] Filed: Jun. 2, 1997

Related U.S. Application Data

[63] Continuation of application No. 08/532,140, Sep. 22, 1995, abandoned.

[51] Int. Cl.⁶ .............................. G05B 13/02; F02D 35/00
[52] U.S. Cl. ..................... 702/32; 702/22; 364/528.09; 364/150; 364/151; 706/15; 706/16; 706/21; 706/25; 701/29
[58] Field of Search ............. 702/32, 22; 364/150, 364/151, 528.09; 701/29; 706/15, 16, 21, 23, 25

[56] References Cited

U.S. PATENT DOCUMENTS

| | | | |
|---|---|---|---|
| 3,859,541 | 1/1975 | Hattori et al. | 307/10 R |
| 3,871,338 | 3/1975 | Schmidt et al. | 123/32 EA |
| 3,875,907 | 4/1975 | Wessel et al. | 123/32 EA |
| 3,903,853 | 9/1975 | Kizler et al. | 123/32 EA |
| 3,916,848 | 11/1975 | Schmidt | 123/32 EA |
| 3,919,983 | 11/1975 | Wahl et al. | 123/32 EA |
| 3,962,866 | 6/1976 | Neidhard et al. | 60/276 |
| 4,007,589 | 2/1977 | Neidhard et al. | 60/276 |
| 4,077,207 | 3/1978 | Hattori et al. | 60/276 |
| 4,161,883 | 7/1979 | Laird et al. | 73/421.5 A |
| 4,167,161 | 9/1979 | Nakagami | 123/75 B |
| 4,171,690 | 10/1979 | Hosaka et al. | 123/119 EG |
| 4,315,243 | 2/1982 | Calvert, Sr. | 340/52 R |
| 4,403,473 | 9/1983 | Gladden | 60/274 |
| 4,528,918 | 7/1985 | Sato et al. | 110/347 |
| 4,825,353 | 4/1989 | Jenkins | 364/152 |
| 5,003,950 | 4/1991 | Kato et al. | 123/422 |
| 5,025,499 | 6/1991 | Inoue et al. | 364/165 |

(List continued on next page.)

FOREIGN PATENT DOCUMENTS 1199144  8/1989  Japan.

OTHER PUBLICATIONS

Jahnke, Ph.D., James A., "Continuous Emission Monitoring", New York: Van Nostrand Reinhold, 1993. Book.

R.W. Serth, C.M. Valero and W.A. Heenan, "Detection of Gross Errors in Nonlinearly Constrained Data: A Case Study", *Chem. Eng. Comm.*, vol. 51, pp. 89–104, 1987.

M.A. Kramer and J.A. Leonard, "Diagnosis Using Back-propagation Neural Networks—Analysis and Criticism", *Computers Chem. Engng.*, vol. 14, No. 14, pp. 1323–1338, 1990.

M.A. Kramer, "Autoassociative Neural Networks", *Computers Chem. Engng.*, vol. 16, No. 4, pp. 313–328, 1992.

R.W. Serth and W.A. Heenan, "Gross Error Detection and Data Reconciliation in Steam–Matering Systems", *AIChE Journal*, vol. 332, No. 5, pp. 733–742, May 1996.

(List continued on next page.)

Primary Examiner—John Barlow
Assistant Examiner—Hien Vo
Attorney, Agent, or Firm—Westman, Champlin & Kelly, P.A.

[57] ABSTRACT

A method and apparatus for providing output emission data corresponding to output emissions from a source of emissions includes a sensing emission monitoring system that senses the output emissions directly from the source of emissions and a predictive emission monitoring system that predicts the output emissions from the source of emissions. The sensing emission monitoring system provides a first set of output values indicative of the output emissions, while the predictive emission monitoring system provides a second set of output values indicative of the output emissions. The system checks the operating state of the sensing emission monitoring system and generates output emission data from the first set of output values if the sensing emission monitoring system is operable and from the second set of the output values if the sensing emission monitoring system is inoperable.

19 Claims, 3 Drawing Sheets

U.S. PATENT DOCUMENTS

| | | | |
|---|---|---|---|
| 5,077,970 | 1/1992 | Hamburg | 60/274 |
| 5,088,314 | 2/1992 | Takashi | 73/23.21 |
| 5,093,792 | 3/1992 | Taki et al. | 364/431.01 |
| 5,113,483 | 5/1992 | Keele et al. | 395/23 |
| 5,117,464 | 11/1993 | Hamburg | 340/439 |
| 5,119,287 | 6/1992 | Nakamura et al. | 364/148 |
| 5,119,468 | 6/1992 | Owens | 395/22 |
| 5,150,682 | 9/1992 | Magnet | 123/417 |
| 5,163,412 | 11/1992 | Neu et al. | 123/700 |
| 5,175,678 | 12/1992 | Frerichs et al. | 364/148 |
| 5,213,080 | 5/1993 | Lambert et al. | 123/417 |
| 5,220,905 | 6/1993 | Lundahl | 123/681 |
| 5,222,471 | 6/1993 | Stueven | 123/695 |
| 5,228,335 | 7/1993 | Clemmens et al. | 73/118.1 |
| 5,231,939 | 8/1993 | Tanaka et al. | 110/347 |
| 5,251,285 | 10/1993 | Inoue et al. | 395/10 |
| 5,270,009 | 12/1993 | Nakamori et al. | 422/83 |
| 5,271,674 | 12/1993 | Kalmanovitch | 374/16 |
| 5,353,207 | 10/1994 | Keeler et al. | 364/164 |
| 5,386,373 | 1/1995 | Keeler et al. | 364/577 |
| 5,479,573 | 12/1995 | Keeler et al. | 395/23 |
| 5,539,638 | 7/1996 | Keeler et al. | 364/424.03 |
| 5,548,528 | 8/1996 | Keeler et al. | 364/497 |
| 5,559,690 | 9/1996 | Keeler et al. | 364/164 |
| 5,613,041 | 3/1997 | Keeler et al. | 395/23 |

OTHER PUBLICATIONS

Brochure: "CEMS Technologies—Continuous Emissions", Rosemount Analytical Inc., Orrville, Ohio, 1991.

Rosemount® Model GMP 1000, "Continuous Emissions Monitoring (CEMS) Package", Product Data 103–101, Mar. 1991.

Thomas C. Elliott, "Software for CAA compliance", *Power*, vol. 138, No. 12, pp. 26, 28–32, Dec. 1994.

CEMWARE™ Emissions Monitoring Solution Customer Guide: "Predictive Emissions Monitoring Q&A", Fisher–Rosemount, pp. 1–8, Feb. 10, 1995.

Samdani, G.S., "Software Takes on Air Monitoring", *Chemical Engineering*, Dec. 1994.

EMISSION MONITORING SYSTEM

This is a continuation of application Ser. No. 08/532,140, filed Sep. 22, 1995, now abandoned.

BACKGROUND OF THE INVENTION

The present invention relates to an emission monitoring system used to monitor emissions produced by a source of emissions. More particularly, the present invention relates to an emission monitoring system having a continuous emission monitoring system and a predictive emission monitoring system.

Recent stringent regulations adopted for the purposes of improving air quality by control of the emission of pollutants from combustion sources such as generating plants and factories have created an urgent necessity for effective stack gas monitoring equipment. Two basic systems, continuous emission monitoring (CEM) systems and predictive emission monitoring (PEM) systems have emerged to allow those emitting pollutants to comply with local, state and federal regulations. The CEM system continuously monitors the emissions of a stack, for example, by extracting gas directly from the stack, measuring the gas directly in the stack with an optical sensor or other suitable sensor, or by using remote sensors that detect emission concentrations by projecting light out to the stack or by sensing the light radiating from "hot" molecules emitted from the stack. Gas analyzers are provided to analyze the gas into each of its constituent parts. Output signals from the gas analyzer or the remote sensors are provided to a data acquisition unit that records values proportional to the input signals received. The recorded values are stored and retrieved as necessary to comply with reporting regulations. In addition, status signals are provided by the gas analyzer indicative of the operational status of each device.

Recently, federal regulations have been amended to allow the use of PEM systems in order to comply with reporting requirements. Likewise, at the state and local levels, legislation has been enacted or is pending that permits the use of PEM systems. Generally, a PEM system models the source of emissions that generates the emissions and predicts the quantity of emissions that are produced given the operating state of the process. Commonly, regression (linear and nonlinear) techniques are used in such modeling. The PEM system is "trained" by monitoring multiple inputs such as pressures, temperatures, flow rates, etc., and one or more output parameters such as $NO_x$, CO, $O_2$, etc. After training, in normal operation, the PEM system monitors only the multiple inputs and calculates estimated output parameter values that closely match the actual pollutant levels.

U.S. Pat. No. 5,386,373 describes a PEM system that predicts the output emissions of a plant. A stored representation of the plant is provided in association with a virtual sensor predictive network to provide as an output, a prediction of the actual pollutant level output of the plant. The stored representation in the virtual sensor predictive network is learned from measuring pollutant levels and associated values for controls of the plant and values of corresponding sensors measuring operating parameters of the plant. In operation, a CEM system is temporarily connected to the plant to monitor the level of pollutants emitted from the plant. The pollutant levels are then correlated with the plant controls and the sensor outputs to form a training data base used to train the virtual sensor predictive network. Once trained, the CEM system can be removed with output emissions predicted by the virtual sensor predictive network. When necessary, a new pollutant sensor or a portable pollutant sensor is periodically utilized to check the operation of the virtual sensor network to ensure that it is operating correctly and that no parameters of the plant have changed such that the prediction is now incorrect or the model no longer represents the plant.

SUMMARY OF THE INVENTION

A method and apparatus for providing output emission data corresponding to output emissions from a source of emissions includes a sensing emission monitoring system that senses the output emissions directly from the source of emissions and a predictive emission monitoring system that predicts the output emissions from the source of emissions. The sensing emission monitoring system provides a first set of output values indicative of the output emissions, while the predictive emission monitoring system provides a second set of output values indicative of the output emissions. In a preferred embodiment, the system checks the operating state of the sensing emission monitoring system and generates output emission data from the first set of output values if the sensing emission monitoring system is operable and from the second set of the output values if the sensing emission monitoring system is inoperable.

By providing both a sensing emission monitoring system and a predictive monitoring system to monitor the same output emissions, the present invention achieves higher assurance that the output emissions will be monitored pursuant to regulatory requirements. In prior art systems, if the emission monitoring system were to fail, operators would have to decide whether to shut down operations, or continue and be liable for expensive fines from a regulatory agency for operating without an emission monitoring system. In the present invention, if either the sensing emission monitoring system or the predictive monitoring system were to fail, operators can continue since output emission data will be obtained from the other system.

In a preferred embodiment, the system compares the first set of output values with the second set of output values, respectively, and retrains the predictive monitoring system when at least one of the second set of output values differs from the corresponding value of the first set of output values by a selected difference. Preferably, at least one output value of the second set of output values includes a bias adjustment. The bias adjustment is adjusted so that the output value of the second set of output values is substantially equal to a corresponding value of the first set of output values. In this manner, the predictive monitoring system need not be retrained for only slight differences between the first set of output values and the second set of output values.

In another aspect of the present invention, the first set of output values and corresponding values of control signals used to control the source of emissions and parameter sensor signals monitoring selected parameters of the source of emissions are stored continuously. When it becomes necessary to retrain the predictive emission monitoring system, the stored values are retrieved so that the most up to date or current data concerning the operating state of the source of emissions is used for retraining the predictive emission monitoring system.

DETAILED DESCRIPTION OF THE PREFERRED EMBODIMENTS

Figure 1:
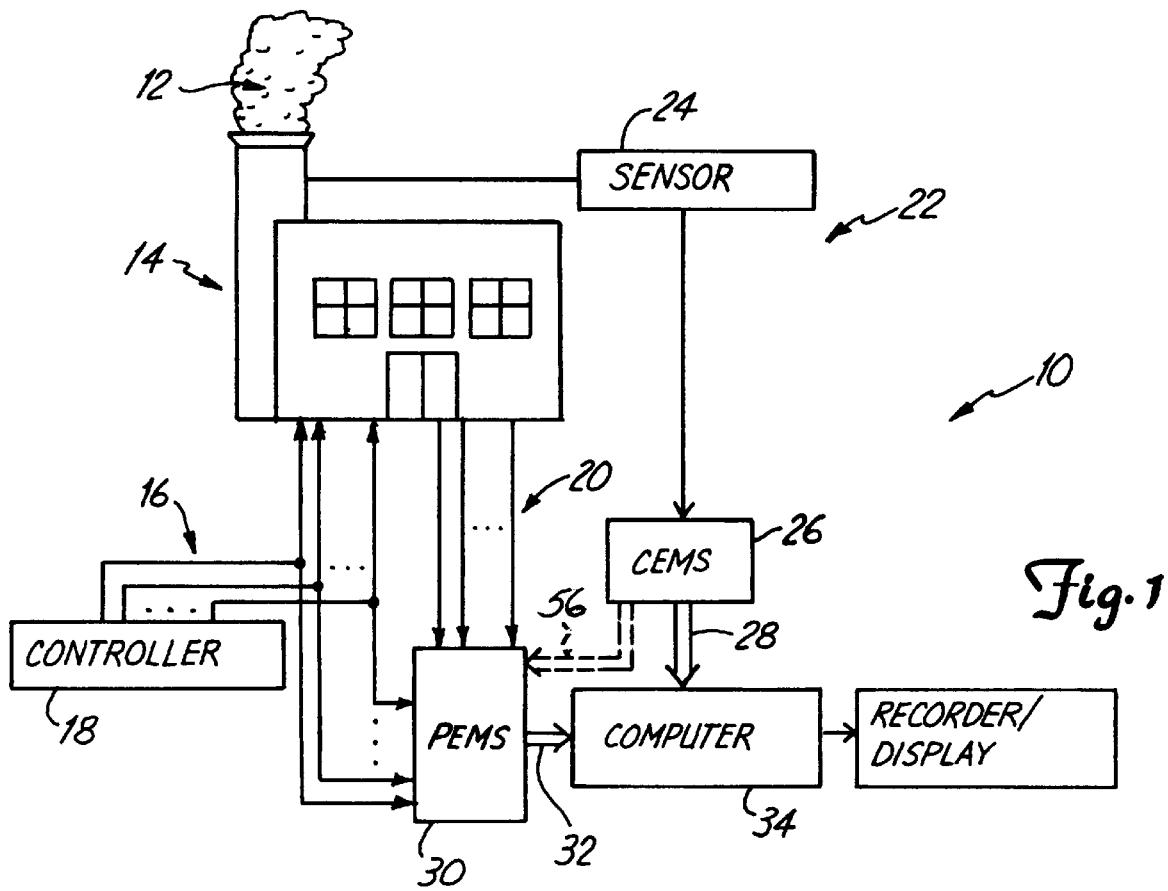
FIG. 1 is an overall block diagram of an emission monitoring system of the present invention.

FIG. 1 illustrates an overall block diagram of a system 10 of the present invention for monitoring emissions 12 from a source of emissions 14 such as a generating plant, industrial plant, manufacturing plant or other facility or process that expels substances that need to be monitored. Generally, the system 10 provides output emission data corresponding to the output emissions 12 from the source of emissions 14. The source of emissions 14 operates in response to control signals 16 from a suitable controller 18 to adjust the source of emissions 14 to different operating states. At least some of the control signals 16 are provided to the system 10 for purposes discussed below. Typically, parameter sensors, not shown, measure selective operating parameters of the source of emissions 14. Selected operating parameters are also provided to the system 10 through signals 20 indicative of the operating parameters.

In the embodiment illustrated, the system 10 includes a sensing emission monitoring system commonly known as a continuous emission monitoring system (CEMS) 22. The CEM system 22 directly measures the output emissions 12 from the source of emissions 14 and is a well known apparatus. Commonly, the CEM system 22 includes a sensor 24 and a suitable computer or data acquisition unit 26 for analyzing the output emissions 12 into each of its constituent parts. If, for example, output stack emissions are to be monitored as herein illustrated, the CEM system 22 includes a gas analyzer that provides corresponding output signals proportional to selected gases to be measured. The output signals from the gas analyzer are provided to a suitable data acquisition unit. Output values 28 are then generated indicative of the output emissions 12.

The system 10 further includes a predictive emission monitoring system (PEMS) 30 that models the emission producing process that generates the output emissions 12 and predicts the quantity of output emissions 12 that are produced given the operating state of the source of emissions 14. Typically, the PEM system 30 receives the control signals 16 and the parameter output signals 20, and uses them in association with a stored mathematical model of the source of emissions 14 to predict the actual output emissions 12, based on the operating state of the source of emissions 14. PEM systems are well known and for purposes of the present invention need not be described in detail. Briefly, the PEM system 30 uses regression (linear or non-linear) models or other suitable models, to represent the emission producing process. By monitoring multiple inputs such as pressures, temperatures, flow rates, etc., and, typically one or more output parameters such as $NO_x$, $CO$, $O_2$, etc., the PEM system 30 learns the process dynamics of the source of emissions 14 so as to predict emission levels of the source of emissions 14 that closely match the actual output emissions 12. The PEM system 30 generates a second set of output values 32 indicative of the output emissions 12.

A computer 34 receives the first set of output values 28 indicative of the output emissions 12 directly monitored by the CEM system 22 and also receives the second set of output values 32 from the PEM system 30 indicative of the predicted output emissions 12. Preferably, as discussed below, the computer 34 checks the operating state of the CEM system 22 and generates output emission data from the first set of output values 28 if the CEM system 22 is operable, and from the second set of output values 32 if the CEM system 22 is inoperable. However, if desired, the computer 34 can generate output emission data selectively from either the CEM system 22 or the PEM system 30 if both are operating.

Figure 2:
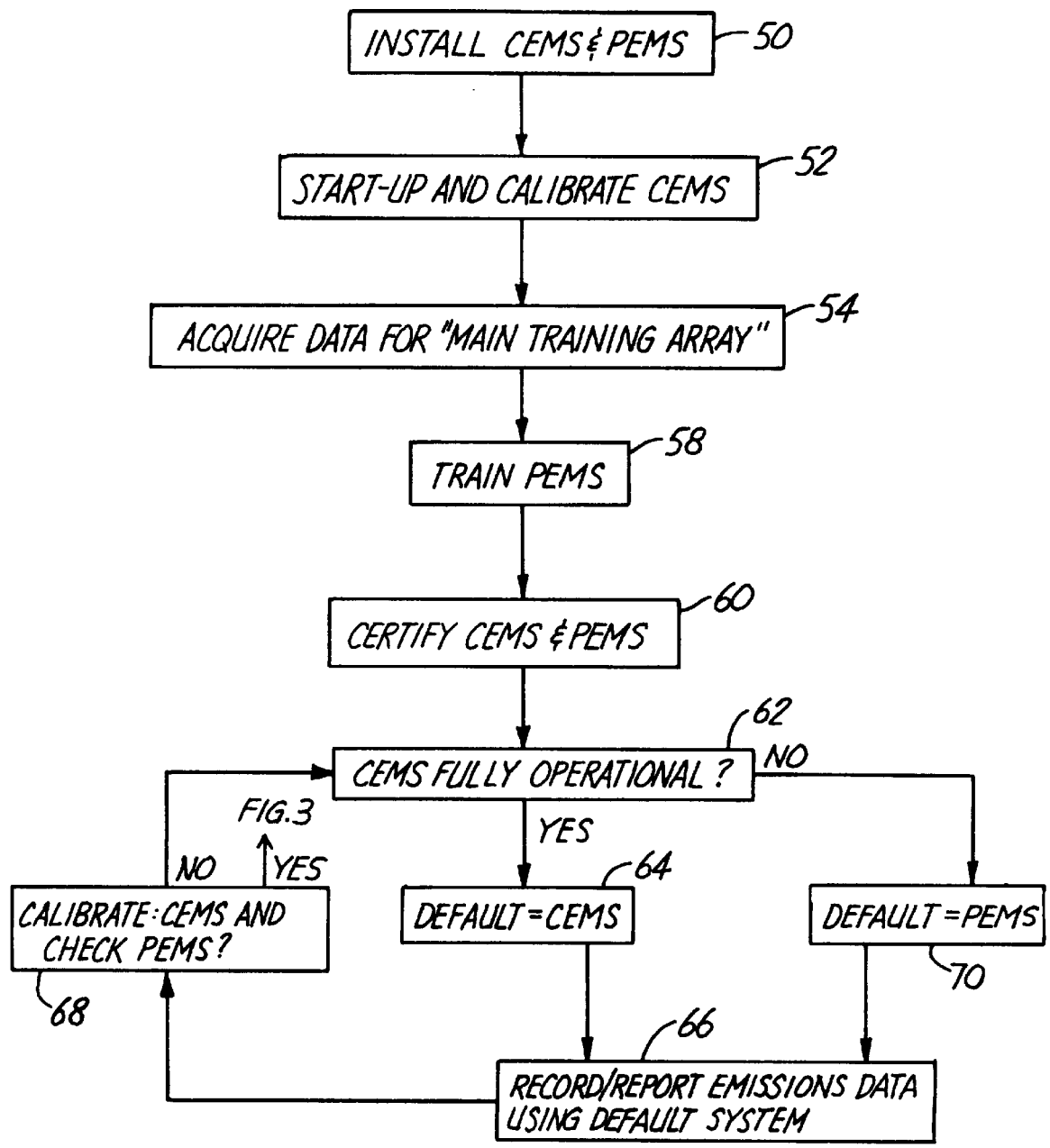
FIG. 2 is a flow chart illustrating operation of the system.

FIG. 2 illustrates a flow chart depicting the overall operation of the system 10. The flow chart begins at a function block 50. Function block 50 represents installation of both the CEM system 22 and the PEM systems 30. As stated above, both the CEM system 22 and the PEM systems 30 are well known devices. The CEM system 22 includes those sensors 24 necessary to measure the selected pollutants and, typically, includes the computer 26 for recording values indicative of the measured pollutants. The PEM system 30 is primarily a software device and can be loaded on any suitable computer such as the computer 26, the controller 18 or its own stand alone computer, as illustrated.

From function block 50, system 10 operation continues to function block 52, which represents startup and calibration of the CEM system 22 pursuant to the manufacturer's suggested calibration procedure. Commonly, known quantities of the pollutants to be measured are placed proximate sensing portions of the CEM system 22 to allow measurement thereof. For example, if stack gasses of a source of emissions are to be measured, known concentrations of pollutants are used and injected into the CEM system 22 per the manufacturer's recommendation and/or regulatory requirements for detection by the CEM system 22.

With the CEM system 22 calibrated and operational, operation of the system 10 continues to function block 54 where data is acquired to train the PEM system 30. Operators control the control signals 16 to achieve different operating states of the source of emissions 14. The control signals 16 and selected parameter signals 20 are provided to the PEM system 30 on a time base. Meanwhile, the CEM system 22 generates output values 56 indicative of the actual output emissions 12 for each operating state of the source of emissions, which are also provided to the PEM system 30, as illustrated in FIG. 1. The output data 56 from the CEM system 22 is also generated on a time base so that it can be combined or merged with values of the control signals 16 and values of the parameter output signals 20.

Each corresponding control signal value, parameter output signal value, and value of each pollutant measured for a selected operating condition of the source of emissions 14 constitutes a data set. By taking selected data sets for different operating conditions of the source of emissions 14, a "Main Training Array" is formed and is provided to the PEM system 30 at the function block 54 in order to develop a mathematical model of the source of emissions 14 at function block 58. At function block 60, both the CEM system 22 and the PEM system 30 are fully operational and are individually certified to provide values 28 and 32 (FIG. 1) indicative of the actual output emissions 12.

At decision block 62, operation of the system 10 enters a repeatable loop when the source of emissions 14 is operational and pollutant levels must be recorded for reporting to federal, state, and/or local authorities. At decision block 62, the operational status of the CEM system 22 is ascertained to determine if the CEM system 22 is operational. Operational status can be determined based on any number of suitable methods. For example, a sensor signal from the sensor 24 measuring the output emissions 12 can include a status signal that, if set, provides an indication that the sensor 24 is not operational. If desired, the output signal for the sensor 24 can be examined to determine if it is outside normal values, in which case the sensor 24 would be considered faulty.

If the CEM system 22 is deemed operational, program flow continues to function block 64 where a default flag is set to represent that output emission data should be obtained from the output values 28 (FIG. 1) generated by the CEM system 22. However, the output values 32 generated by the PEM system 30 are also stored for future comparison with the output values 28 generally by the CEM system 22. Program flow then continues to function block 64 where the computer 34 obtains the values 28 from the CEM system 22 and suitably processes each value to record the value for subsequent reporting.

From function block 66, program flow continues to decision block 68. Decision block 68 allows for periodic calibration of the CEM system 22 and adjustment of the PEM system 30 which will be discussed below. If calibration is not needed, program flow returns to decision block 62.

If the CEM system 22 is determined not to be operational at decision block 62, program flow continues to function block 70 where the default flag is set to represent that output emissions data should be obtained from the output values 32 (FIG. 1) generated by the PEM system 30. Program flow then continues to function block 66, and if the default flag is set to the PEM system 30, the computer 34 generates output emission data using output values 32 received from the PEM system 30.

Figure 3:
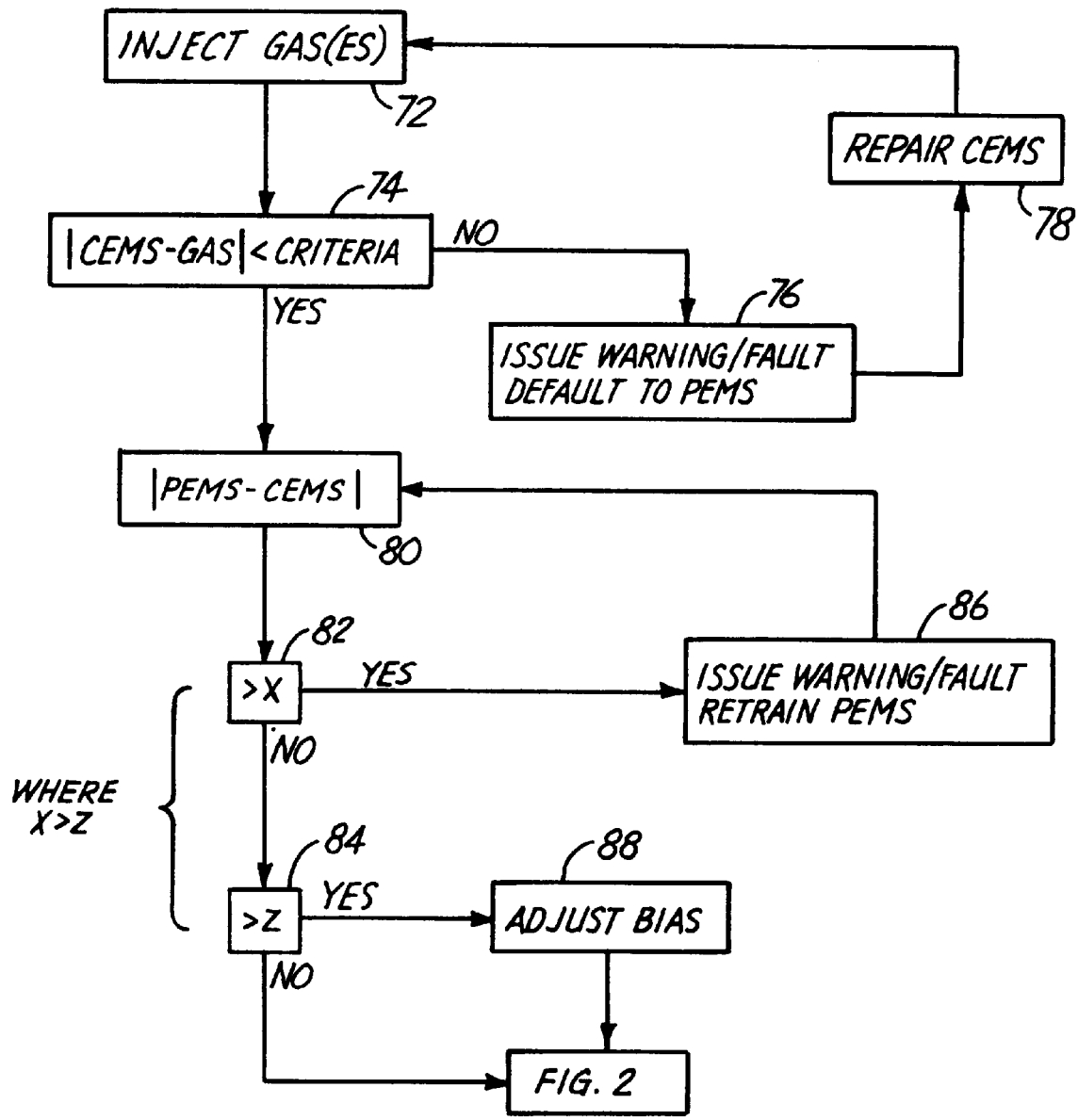
FIG. 3 is a flow chart illustrating the step of calibration of a PEM system.

Periodic calibration of the CEM system 22 is illustrated in FIG. 3. Using by way of example, monitoring of stack gasses, known concentrations of the pollutants to be measured are injected into the CEM system 22 per the manufacturer's recommendation and/or regulatory requirements at function block 72 for subsequent detection by the CEM system 22. At decision block 74, the resultant output value obtained from the CEM system 22 for each pollutant to be measured is compared to the known concentration of the pollutant gas injected into the stack. If the difference between the measured value and the known value exceeds a selected threshold, a warning is issued at function block 76 to indicate that the CEM system 22 is not operational. Suitable steps are then carried out upon the CEM system 22 to repair the CEM system 22 and are represented by function block 78.

If at decision block 74 the output values from the CEM system 22 are sufficiently accurate, selected, previously recorded, output values 32 generated by the PEM system 30 are compared to corresponding values 28 measured by the CEM system 22 at function block 80. Decision blocks 82 and 84, and function blocks 86 and 88 represent comparison of one selected pollutant. It should be understood that the method of comparison illustrated with decision blocks 82 and 84 and function blocks 86 and 88, would be performed for each pollutant of the output emissions 12 monitored.

If the output value 32 from the PEM system 30 for the particular pollutant exceeds a threshold, represented in FIG. 3 as "X", when compared to the measured value from the CEM system 22, program flow continues to function block 86 whereat a warning is issued indicating that the PEM system 30 is not operational and suitable steps are taken to retrain the PEM system 30 and obtain a new mathematical model of the source of emissions 14.

If the output value of the PEM system 30 of the selected pollutant does not exceed the selected threshold "X" when compared to the measured value from the CEM system 22, program flow continues to decision block 84. Decision block 84 ascertains whether the difference between the value generated from the PEM system 30 exceeds a second threshold, represented in FIG. 3 as "Y", when compared to the corresponding measured value from the CEM system 22. If the second threshold "Y" is exceeded, an adjustment value is recorded in the PEM system 30 so as to make the value from the PEM system 30 correspond with the measured value from the CEM system 30. Typically, the adjustment value comprises a scaler quantity which can be simply added to the value generated by the PEM system 30 so as to make it correspond with the value measured by the CEM system 22. However, if desired other mathematical operations such as multiplication or representing the adjustment value as a function can be used instead of or in addition to the scaler quantity. After suitable adjustments are made to each of the values 32 generated by the PEM system 30, or if the values 32 of the PEM system 30 were sufficiently accurate when compared to the values 28 measured by the CEM system 22 so as not to exceed the second selected threshold "Y", program flow returns to function block 62 in FIG. 2.

Figure 4:
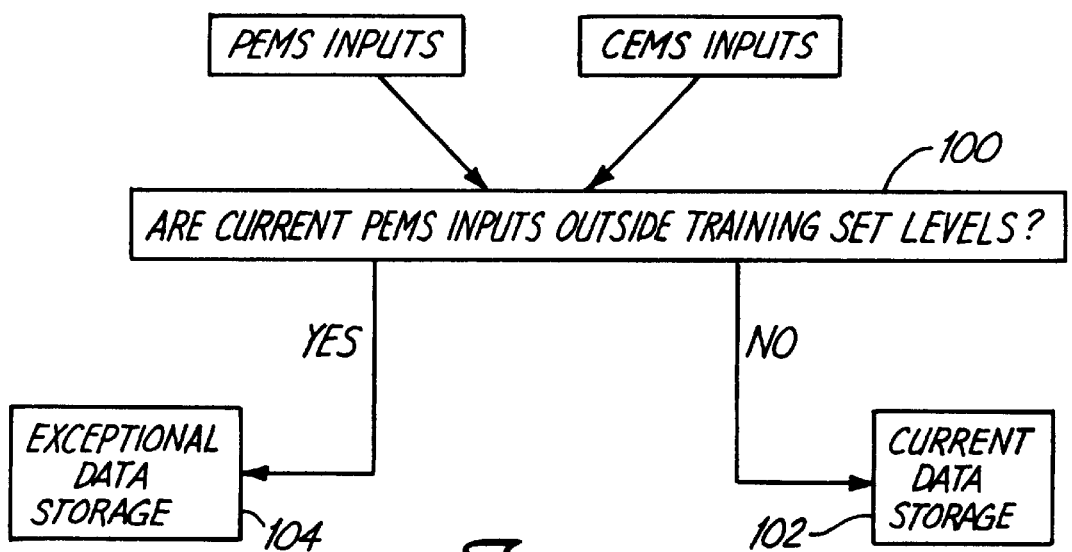
FIG. 4 is a flow chart illustrating storage of data sets.

FIG. 4 illustrates another aspect of the present invention. As described above, measurements from the CEM system 22 are continually obtained at function block 66, while the CEM system 22 is operational. In the preferred embodiment, control values corresponding to control signals 16 provided from the controller 34 to various parts of the source of emissions 14, and sensor values corresponding to the parameter sensors signals 20 described above are also obtained and correlated with the measured values 28 from the CEM system 22. The values of the control signals 16, sensor signals 20, and the measured values 28, from the CEM system 22 are correlated in time into data sets. Each individual data set is then compared to the data sets comprising the Main Training Array at functional block 100. If the operating state of the source of emissions 14 (as determined by the values of the control signals 16 and sensor signals 20, i.e. suitably equal to a data set in the Main Training Array) constitutes part of the Main Training Array, then the data set corresponding to this operating state is replaced with the newly formed data set at function block 102 so that upon retraining of the PEM system, the most accurate data indicative of the condition of the source of emissions 14 is used. If the newly formed data set has no corresponding data set in the Main Training Data Array, the newly formed data set is stored in an "exceptional" data storage area at function block 104 since this operating state of the source of emissions 14 is typically not available during training.

Periodically, data sets in the exceptional data storage area are removed and saved in another location, thereby freeing-up storage space so that additional exceptional data sets can be obtained. When retraining of the PEM system 30 is required, data sets stored in the current data storage 102 are combined with the exceptional data sets that are not too old to retrain the PEM system 30. If sufficient data storage is available, remote storage of exceptional data sets may not be required.

Although the present invention has been described with reference to preferred embodiments, workers skilled in the art will recognize that changes may be made in form and detail without departing from the spirit and scope of the invention.

What is claimed is:

1. A method for providing output emission data corresponding to output emissions from a source of emissions operating in response to control signals from corresponding controls and having parameter sensors measuring selected operating parameters of the source of emissions and providing corresponding sensor output signals, the method comprising the steps of:

measuring the output emissions directly from the source of emissions with a sensing emission monitoring system and providing a first set of output values indicative of the output emissions;

predicting the output emissions from the source of emissions with a predictive emission monitoring system receiving the control signals and the sensor output signals, the predictive emission monitoring system providing a second set of output values indicative of the output emissions;

checking an operating state of the sensing emission monitoring system; and generating the output emission data from the first set of output values if the sensing emission monitoring system is operable and the second set of output values if the sensing emission monitoring system is inoperable.

2. The method of claim 1 wherein the step of checking includes calibrating the sensing emission monitoring system with calibrated output emissions.

3. The method of claim 1 wherein the sensing emission monitoring system provides a status output signal indicative of an operating status of the sensing emission monitoring system, and wherein the step of checking includes monitoring the status output signal.

4. The method of claim 1 wherein the step of checking includes monitoring at least one of the first set of output values to ascertain if said at least one of the first set of output values is outside a selected range.

5. The method of claim 1 and further comprising the steps of comparing the first set of output values with the second set of output values; and retraining the predictive emission monitoring system when the second set of output values differs from the first set of output values by a selected difference.

6. The method of claim 5 wherein at least one output value of the second set of output values includes a bias adjustment and wherein the step of comparing includes adjusting the bias adjustment if a difference between said at least one output value and a corresponding value of the first set of output values is less than the selected difference.

7. The method of claim 6 wherein the step of comparing includes adjusting the bias adjustment if the difference between said at least one output value and the corresponding value of the first set of output values is more than a second selected difference, the second selected difference being less than the first-mentioned selected difference.

8. The method of claim 1 and further comprising the steps of training the predictive emission monitoring system using a set of control signal values each having a range of values; and storing the first set of output values and corresponding values of the control signals if at least one value of the control signals values exceeds the corresponding range of said at least one value of the control signal.

9. The method of claim 8 and wherein the step of storing includes storing the first set of output values and the corresponding values of the control signal values in a first memory location if said at least one value of the control signal values exceeds a corresponding range of said at least one value of the control signal and in a second memory location if said at least one value of the control signal values is within the corresponding range of said at least one value of the control signal.

10. An apparatus providing output emission data corresponding to output emissions from a source of emissions operating in response to control signals from corresponding controls and having parameter sensors measuring selected operating parameters of the source of emissions and providing corresponding sensor output signals, the apparatus comprising:

a sensing emission monitoring system for sensing the output emissions directly from the source of emissions and providing a first set of output values indicative of the output emissions;

a predictive emission monitoring system for predicting the output emissions from the source of emissions, the predictive emission monitoring system receiving the control signals and the sensor output signals and providing a second set of output values indicative of the output emissions; and a computer receiving the first and second sets of output values and generating the output emission data from the first set of output values if the sensing emission monitoring system is operable and from the second set of output values if the sensing emission monitoring system is inoperable.

11. The apparatus of claim 10 wherein the sensing emission monitoring system provides a status output signal indicative of an operating status of the sensing emission monitoring system, and wherein the computer receives the status output signal.

12. The apparatus of claim 10 wherein the computer monitors at least one of the first set of output values to ascertain if said at least one of the first set of output values is outside a selected range.

13. A method for acquiring data for training a predictive emission monitoring system that generates output values indicative of output emissions from a source of emissions, the predictive emission monitoring system being trained using a training data set, the training data set including a plurality of data sets comprising at least one of values indicative of control signals from corresponding controls and parameter sensors measuring selected operating parameters of the source of emissions correlated with actual output emission values corresponding to said at least one of values indicative of control signals from corresponding controls and parameter sensors measuring selected operating parameters of the source of emissions and providing corresponding sensor output signals, the method comprising the steps of:

obtaining a new data set comprising a new actual output emission value for said at least one of values indicative of control signals from corresponding controls and parameter sensors measuring selected operating parameters of the source of emissions; and updating the training data set with the new data set.

14. The method of claim 13 and further comprising the step of comparing the new data set with the training data set, and wherein the step of updating includes updating the training data set with the new data set if the new data set is out of a range of the training data set.

15. A method for providing output emission data corresponding to output emissions from a source of emissions operating in response to control signals from corresponding controls and having parameter sensors measuring selected operating parameters of the source of emissions and providing corresponding sensor output signals, the method comprising the steps of:

installing a sensing emission monitoring system at the source of emissions;

installing and training a predictive emission monitoring system at the source of emissions;

measuring the output emissions directly from the source of emissions during normal operation thereof with the sensing emission monitoring system and providing a first set of output values indicative of the output emissions;

predicting the output emissions from the source of emissions during normal operation thereof with the predictive emission monitoring system receiving the control signals and the sensor output signals, the predictive emission monitoring system providing a second set of output values indicative of the output emissions;

comparing periodically the first set of output values with the second set of output values during normal operation of the source of emissions; and providing an indication to retrain the predictive emission monitoring system if a difference between any one of the second set of output values and a corresponding value of the first set of output values exceeds a selected threshold.

16. The method of claim 15 wherein at least one output value of the second set of output values includes a bias adjustment and wherein the step of comparing includes adjusting the bias adjustment if a difference between said at least one output value and a corresponding value of the first set of output values is less than the selected threshold.

17. The method of claim 15 and further comprising:

acquiring a training data set for training the predictive emission monitoring system, the training data set including a plurality of data sets comprising at least one of values indicative of control signals from corresponding controls and parameter sensors measuring selected operating parameters of the source of emissions correlated with actual output emission values corresponding to said at least one of values indicative of control signals from corresponding controls and parameter sensors measuring selected operating parameters of the source of emissions;

obtaining a new data set during normal operation of the source of emissions comprising a new actual output emission value for said at least one of values indicative of control signals from corresponding controls and parameter sensors measuring selected operating parameters of the source of emissions; and updating the training data set with the new data set.

18. The method of claim 17 and further comprising the step of comparing the new data set with the training data set, and wherein the step of updating includes updating the training data set with the new data set if the new data set is out of a range of the training data set.

19. A method for providing output emission data corresponding to output emissions from a source of emissions operating in response to control signals from corresponding controls and having parameter sensors measuring selected operating parameters of the source of emissions and providing corresponding sensor output signals, the method comprising the steps of:

installing a sensing emission monitoring system at the source of emissions;

installing and training a predictive emission monitoring system at the source of emissions;

measuring the output emissions directly from the source of emissions during normal operation thereof with the sensing emission monitoring system and providing a first set of output values indicative of the output emissions;

predicting the output emissions from the source of emissions during normal operation thereof with the predictive emission monitoring system receiving the control signals and the sensor output signals, the predictive emission monitoring system providing a second set of output values indicative of the output emissions, wherein at least one output value of the second set of output values includes a bias adjustment;

comparing periodically the first set of output values with the second set of output values during normal operation of the source of emissions; and adjusting the bias adjustment if a difference between said at least one output value and a corresponding value of the first set of output values is less than a selected difference.

* * * * *